(12) United States Patent
Li et al.

(10) Patent No.: US 12,288,380 B2
(45) Date of Patent: Apr. 29, 2025

(54) SYSTEMS AND METHODS FOR UNIFIED VISION-LANGUAGE UNDERSTANDING AND GENERATION

(71) Applicant: Salesforce, Inc., San Francisco, CA (US)

(72) Inventors: Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 330 days.

(21) Appl. No.: 17/745,634

(22) Filed: May 16, 2022

(65) Prior Publication Data

US 2023/0237773 A1 Jul. 27, 2023

Related U.S. Application Data

(60) Provisional application No. 63/301,978, filed on Jan. 21, 2022.

(51) Int. Cl.
*G06V 10/774* (2022.01)
*G06F 40/126* (2020.01)
(Continued)

(52) U.S. Cl.
CPC .......... *G06V 10/774* (2022.01); *G06F 40/126* (2020.01); *G06F 40/284* (2020.01);
(Continued)

(58) Field of Classification Search
CPC .. G06V 10/774; G06V 10/764; G06F 40/126; G06F 40/284
See application file for complete search history.

(56) References Cited

U.S. PATENT DOCUMENTS

2021/0082398 A1 3/2021 Hori et al.
2022/0147838 A1* 5/2022 Gu .......................... G06V 20/00
(Continued)

FOREIGN PATENT DOCUMENTS

CN 113792113 A 12/2021

OTHER PUBLICATIONS

Li, Junnan, et al. "Blip: Bootstrapping language-image pre-training for unified vision-language understanding and generation." International conference on machine learning. PMLR, Feb. 15, 2022 (Year: 2022).*
(Continued)

*Primary Examiner* — Michael Robert Cammarata
(74) *Attorney, Agent, or Firm* — Haynes and Boone, LLP

(57) ABSTRACT

Embodiments described herein provide systems, methods, and devices for generating enhanced vison-language training data. A method may include: receiving, from a communication interface, a first training dataset of image-text pairs and a second training dataset of annotated image-text pairs; fine-tuning an image-grounded text decoder and an image-grounded text encoder using the second training dataset of annotated image-text pairs; generating, by the fine-tuned image-grounded text decoder, a predicted text based on a training image from the first training dataset; generating, by the fine-tuned image-grounded text encoder, a filtering decision based on the training image and the predicted text; adding the training image and the predicted text to form a third training dataset of image-text pairs depending on the filter decision; and training a vision-language model using the third training dataset of image-text pairs.

20 Claims, 15 Drawing Sheets

(51) Int. Cl.
*G06F 40/284* (2020.01)
*G06T 9/00* (2006.01)
*G06V 10/764* (2022.01)
*G06V 10/80* (2022.01)

(52) U.S. Cl.
CPC .............. *G06T 9/00* (2013.01); *G06V 10/764* (2022.01); *G06V 10/803* (2022.01)

(56) References Cited

U.S. PATENT DOCUMENTS

| | | | |
|---|---|---|---|
| 2022/0156527 A1 | 5/2022 | Ramasamy et al. | |
| 2022/0207001 A1 | 6/2022 | Ong et al. | |
| 2023/0081171 A1* | 3/2023 | Zhang | G06T 11/00 |
| | | | 382/157 |
| 2023/0124389 A1 | 4/2023 | Wang et al. | |
| 2023/0177810 A1 | 6/2023 | Xu et al. | |
| 2023/0222285 A1* | 7/2023 | Zhang | G06F 16/483 |
| | | | 715/255 |
| 2023/0281400 A1* | 9/2023 | Wang | G06F 40/284 |
| | | | 704/2 |
| 2023/0281963 A1* | 9/2023 | Gopalkrishna | G06V 10/806 |
| | | | 382/157 |
| 2023/0351149 A1* | 11/2023 | Yu | G06N 3/045 |
| 2024/0185602 A1* | 6/2024 | Liu | G06F 40/40 |

OTHER PUBLICATIONS

Gan, Zhe, et al. "Vision-language pre-training: Basics, recent advances, and future trends." Foundations and Trends® in Computer Graphics and Vision 14.3-4 (2022): 163-352. (Year: 2022).*

Cho, Jaemin, et al. "Unifying vision-and-language tasks via text generation." International Conference on Machine Learning. PMLR, 2021. (Year: 2021).*

C. Zhang, Z. Yang, X. He and L. Deng, "Multimodal Intelligence: Representation Learning, Information Fusion, and Applications," in IEEE Journal of Selected Topics in Signal Processing, vol. 14, No. 3, pp. 478-493, Mar. 2020, doi: 10.1109/JSTSP.2020.2987728. (Year: 2020).*

* cited by examiner

| Pre-train dataset | Bootstrap C | Bootstrap F | Vision backbone | Retrieval-FT (COCO) TR@1 | Retrieval-FT (COCO) IR@1 | Retrieval-ZS (Flickr) TR@1 | Retrieval-ZS (Flickr) IR@1 | Caption-FT B@4 | Caption-FT (COCO) CIDEr | Caption-ZS (NoCaps) CIDEr | Caption-ZS (NoCaps) SPICE |
|---|---|---|---|---|---|---|---|---|---|---|---|
| COCO+VG +CC+SBU (14M imgs) | ✗ | ✗ | ViT-B/16 | 78.4 | 60.7 | 93.9 | 82.1 | 38.0 | 127.8 | 102.2 | 13.9 |
| | ✗ | ✓$_B$ | | 79.1 | 61.5 | 94.1 | 82.8 | 38.1 | 128.2 | 102.7 | 14.0 |
| | ✓$_B$ | ✗ | | 79.7 | 62.0 | 94.4 | 83.6 | 38.4 | 128.9 | 103.4 | 14.2 |
| | ✓$_B$ | ✓$_B$ | | 80.6 | 63.1 | 94.8 | 84.9 | 38.6 | 129.7 | 105.1 | 14.4 |
| COCO+VG +CC+SBU +LAION (29M imgs) | ✗ | ✗ | ViT-B/16 | 79.6 | 62.0 | 94.3 | 83.6 | 38.8 | 130.1 | 105.4 | 14.2 |
| | ✓$_B$ | ✓$_B$ | | 81.9 | 64.3 | 96.0 | 85.0 | 39.4 | 131.4 | 106.3 | 14.3 |
| | ✓$_L$ | ✓$_L$ | | 81.2 | 64.1 | 96.0 | 85.5 | 39.7 | 133.3 | 109.6 | 14.7 |
| | ✗ | ✗ | ViT-L/16 | 80.6 | 64.1 | 95.1 | 85.5 | 40.3 | 135.5 | 112.5 | 14.7 |
| | ✓$_L$ | ✓$_L$ | | 82.4 | 65.1 | 96.7 | 86.7 | 40.4 | 136.7 | 113.2 | 14.8 |

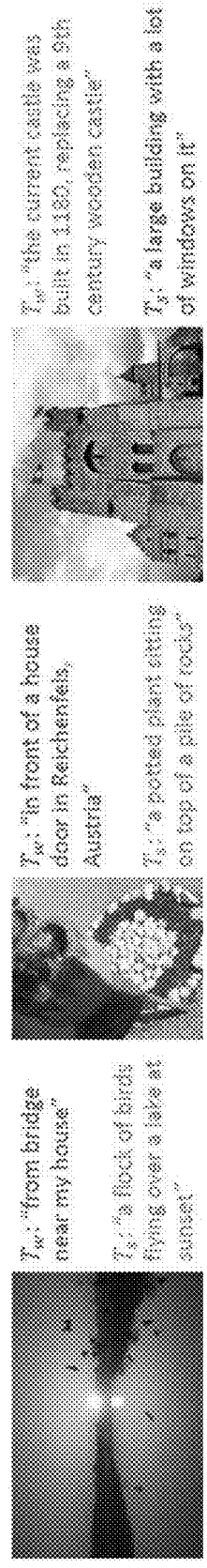

FIG. 7

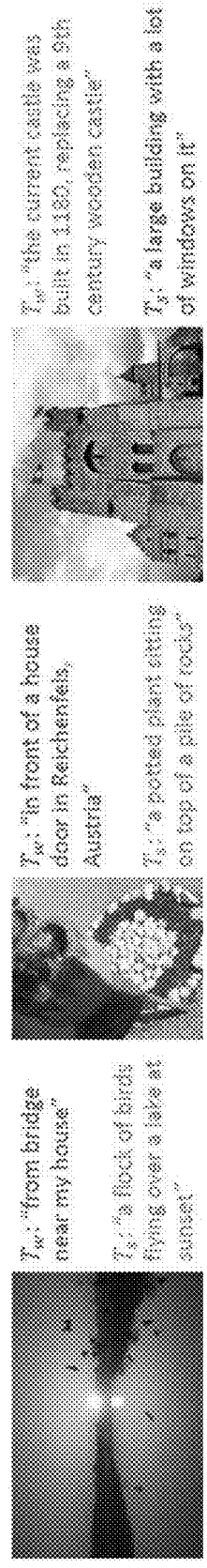

FIG. 8

| Generation method | Noise ratio | Retrieval-FT (COCO) TR@1 | Retrieval-FT (COCO) IR@1 | Retrieval-ZS (Flickr) TR@1 | Retrieval-ZS (Flickr) IR@1 | Caption-FT (COCO) B@4 | Caption-FT (COCO) CIDEr | Caption-ZS (NoCaps) CIDEr | Caption-ZS (NoCaps) SPICE |
|---|---|---|---|---|---|---|---|---|---|
| None | N.A. | 78.4 | 60.7 | 93.9 | 82.1 | 38.0 | 127.8 | 102.2 | 13.9 |
| Beam | 19% | 79.6 | 61.9 | 94.1 | 83.1 | 38.4 | 128.9 | 103.5 | 14.2 |
| Nucleus | 25% | 80.6 | 63.1 | 94.8 | 84.9 | 38.6 | 129.7 | 105.1 | 14.4 |

FIG. 9

| Layers shared | #parameters | Retrieval-FT (COCO) TR@1 | Retrieval-FT (COCO) IR@1 | Retrieval-ZS (Flickr) TR@1 | Retrieval-ZS (Flickr) IR@1 | Caption-FT (COCO) B@4 | Caption-FT (COCO) CIDEr | Caption-ZS (NoCaps) CIDEr | Caption-ZS (NoCaps) SPICE |
|---|---|---|---|---|---|---|---|---|---|
| All | 161M | 77.3 | 59.5 | 93.1 | 81.0 | 37.2 | 125.9 | 100.9 | 13.1 |
| All except CA | 190M | 77.5 | 59.9 | 93.1 | 81.3 | 37.4 | 126.1 | 101.2 | 13.1 |
| All except SA | 190M | 78.4 | 60.7 | 93.9 | 82.1 | 38.0 | 127.8 | 102.2 | 13.9 |
| None | 275M | 78.3 | 60.5 | 93.6 | 81.9 | 37.8 | 127.4 | 101.8 | 13.9 |

FIG. 10

| Captioner & Filter | Noise ratio | Retrieval-FT (COCO) TR@1 | Retrieval-FT (COCO) IR@1 | Retrieval-ZS (Flickr) TR@1 | Retrieval-ZS (Flickr) IR@1 | Caption-FT (COCO) B@4 | Caption-FT (COCO) CIDEr | Caption-ZS (NoCaps) CIDEr | Caption-ZS (NoCaps) SPICE |
|---|---|---|---|---|---|---|---|---|---|
| Share parameters | 8% | 79.8 | 62.2 | 94.3 | 83.7 | 38.4 | 129.0 | 103.5 | 14.2 |
| Decoupled | 25% | 80.6 | 63.1 | 94.8 | 84.9 | 38.6 | 129.7 | 105.1 | 14.4 |

FIG. 11

| Method | Pre-train # Images | COCO (5K test set) TR | | | COCO (5K test set) IR | | | Flickr30K (1K test set) TR | | | Flickr30K (1K test set) IR | | |
|---|---|---|---|---|---|---|---|---|---|---|---|---|---|
| | | R@1 | R@5 | R@10 | R@1 | R@5 | R@10 | R@1 | R@5 | R@10 | R@1 | R@5 | R@10 |
| UNITER | 4M | 65.7 | 88.6 | 93.8 | 52.9 | 79.9 | 88.0 | 87.3 | 98.0 | 99.2 | 75.6 | 94.1 | 96.8 |
| VILLA | 4M | - | - | - | - | - | - | 87.9 | 97.5 | 98.8 | 76.3 | 94.2 | 96.8 |
| OSCAR | 4M | 70.0 | 91.1 | 95.5 | 54.0 | 80.8 | 88.5 | - | - | - | - | - | - |
| UNIMO | 5.7M | - | - | - | - | - | - | 89.4 | 98.9 | 99.8 | 78.0 | 94.2 | 97.1 |
| ALIGN | 1.8B | 77.0 | 93.5 | 96.9 | 59.9 | 83.3 | 89.8 | 95.3 | 99.8 | 100.0 | 84.9 | 97.4 | 98.6 |
| ALBEF | 14M | 77.6 | 94.3 | 97.2 | 60.7 | 84.3 | 90.5 | 95.9 | 99.8 | 100.0 | 85.6 | 97.5 | 98.9 |
| BLIP | 14M | 80.6 | 95.2 | 97.6 | 63.1 | 85.3 | 91.1 | 96.6 | 99.8 | 100.0 | 87.2 | 97.5 | 98.8 |
| BLIP | 129M | 81.9 | 95.4 | 97.8 | 64.3 | 85.7 | 91.5 | 97.3 | 99.9 | 100.0 | 87.3 | 97.6 | 98.9 |
| BLIP$_{CapFilt-L}$ | 129M | 81.2 | 95.7 | 97.9 | 64.1 | 85.8 | 91.6 | 97.2 | 99.9 | 100.0 | 87.5 | 97.7 | 98.9 |
| BLIP$_{ViT-L}$ | 129M | 82.4 | 95.4 | 97.9 | 65.1 | 86.3 | 91.8 | 97.4 | 99.8 | 99.9 | 87.6 | 97.7 | 99.0 |

FIG. 12

| Method | Pre-train # Images | Flickr30K (1K test set) TR | | | Flickr30K (1K test set) IR | | |
|---|---|---|---|---|---|---|---|
| | | R@1 | R@5 | R@10 | R@1 | R@5 | R@10 |
| CLIP | 400M | 88.0 | 98.7 | 99.4 | 68.7 | 90.6 | 95.2 |
| ALIGN | 1.8B | 88.6 | 98.7 | 99.7 | 75.7 | 93.8 | 96.8 |
| ALBEF | 14M | 94.1 | 99.5 | 99.7 | 82.8 | 96.3 | 98.1 |
| BLIP | 14M | 94.8 | 99.7 | 100.0 | 84.9 | 96.7 | 98.3 |
| BLIP | 129M | 96.0 | 99.9 | 100.0 | 85.0 | 96.8 | 98.6 |
| BLIP$_{CapFilt-L}$ | 129M | 96.0 | 99.9 | 100.0 | 85.5 | 96.8 | 98.7 |
| BLIP$_{ViT-L}$ | 129M | 96.7 | 100.0 | 100.0 | 86.7 | 97.3 | 98.7 |

FIG. 13

| Method | Pre-train #Images | in-domain C | in-domain S | NoCaps validation near-domain C | near-domain S | out-domain C | out-domain S | overall C | overall S | COCO Caption Karpathy test B@4 | COCO Caption Karpathy test C |
|---|---|---|---|---|---|---|---|---|---|---|---|
| Enc-Dec | 15M | 92.6 | 12.5 | 88.3 | 12.1 | 94.5 | 11.9 | 90.2 | 12.1 | - | 110.9 |
| VinVL† | 5.7M | 103.1 | 14.2 | 96.1 | 13.8 | 88.3 | 12.1 | 95.5 | 13.5 | 38.2 | 129.3 |
| LEMON$_{base}$† | 12M | 104.5 | 14.6 | 100.7 | 14.0 | 96.7 | 12.4 | 100.4 | 13.8 | - | - |
| LEMON$_{base}$† | 200M | 107.7 | 14.7 | 106.2 | 14.3 | 107.9 | 13.1 | 106.8 | 14.1 | 40.3 | 133.3 |
| BLIP | 14M | 111.3 | 15.1 | 104.5 | 14.4 | 102.4 | 13.7 | 105.1 | 14.4 | 38.6 | 129.7 |
| BLIP | 129M | 109.1 | 14.8 | 105.8 | 14.4 | 105.7 | 13.7 | 106.3 | 14.3 | 39.4 | 131.4 |
| BLIP$_{CapFilt-L}$ | 129M | 111.8 | 14.9 | 108.6 | 14.8 | 111.5 | 14.2 | 109.6 | 14.7 | 39.7 | 133.3 |
| LEMON$_{large}$† | 200M | 116.9 | 15.8 | 113.3 | 15.1 | 111.3 | 14.0 | 113.4 | 15.0 | 40.6 | 135.7 |
| SimVLM$_{huge}$† | 1.8B | 113.7 | - | 110.9 | - | 115.2 | - | 112.2 | - | 40.6 | 143.3 |
| BLIP$_{ViT-L}$ | 129M | 114.9 | 15.2 | 112.1 | 14.9 | 115.3 | 14.4 | 113.2 | 14.8 | 40.4 | 136.7 |

*FIG. 14*

| Method | Pre-train #Images | VQA test-dev | VQA test-std | NLVR² dev | NLVR² test-P |
|---|---|---|---|---|---|
| LXMERT | 180K | 72.42 | 72.54 | 74.90 | 74.50 |
| UNITER | 4M | 72.70 | 72.91 | 77.18 | 77.85 |
| VL-T5/BART | 180K | - | 71.3 | - | 73.6 |
| OSCAR | 4M | 73.16 | 73.44 | 78.07 | 78.36 |
| SOHO | 219K | 73.25 | 73.47 | 76.37 | 77.32 |
| VILLA | 4M | 73.59 | 73.67 | 78.39 | 79.30 |
| UNIMO | 5.6M | 75.06 | 75.27 | - | - |
| ALBEF | 14M | 75.84 | 76.04 | 82.55 | 83.14 |
| SimVLM$_{base}$† | 1.8B | 77.87 | 78.14 | 81.72 | 81.77 |
| BLIP | 14M | 77.54 | 77.62 | 82.67 | 82.30 |
| BLIP | 129M | 78.24 | 78.17 | 82.48 | 83.08 |
| BLIP$_{CapFilt-L}$ | 129M | 78.25 | 78.32 | 82.15 | 82.24 |

*FIG. 16*

| Method | MRR↑ | R@1↑ | R@5↑ | R@10↑ | MR↓ |
|---|---|---|---|---|---|
| VD-BERT | 67.44 | 54.02 | 83.96 | 92.33 | 3.53 |
| VD-ViLBERT† | 69.10 | 55.88 | 85.50 | 93.29 | 3.25 |
| BLIP | 69.41 | 56.44 | 85.90 | 93.30 | 3.20 |

*FIG. 17*

| Method | R1↑ | R5↑ | R10↑ | MdR↓ |
|---|---|---|---|---|
| *zero-shot* | | | | |
| ActBERT | 8.6 | 23.4 | 33.1 | 36 |
| SupportSet | 8.7 | 23.0 | 31.1 | 31 |
| MIL-NCE | 9.9 | 24.0 | 32.4 | 29.5 |
| VideoCLIP | 10.4 | 22.2 | 30.0 | - |
| FiT | 18.7 | 39.5 | 51.6 | 10 |
| BLIP | 43.3 | 65.6 | 74.7 | 2 |
| *finetuning* | | | | |
| ClipBERT | 22.0 | 46.8 | 59.9 | 6 |
| VideoCLIP | 30.9 | 55.4 | 66.8 | - |

*FIG. 18*

| Method | MSRVTT-QA | MSVD-QA |
|---|---|---|
| *zero-shot* | | |
| VQA-T | 2.9 | 7.5 |
| BLIP | 19.2 | 35.2 |
| *finetuning* | | |
| HME | 33.0 | 33.7 |
| HCRN | 35.6 | 36.1 |
| VQA-T | 41.5 | 46.3 |

*FIG. 19*

SYSTEMS AND METHODS FOR UNIFIED VISION-LANGUAGE UNDERSTANDING AND GENERATION

CROSS REFERENCES

The instant application is a nonprovisional of and claims priority under 35 U.S.C. 119 to U.S. provisional application No. 63/301,978, filed Jan. 21, 2022.

This instant application is related to U.S. nonprovisional application Ser. No. 17/745,540, filed on the same day.

Both applications are hereby expressly incorporated by reference herein in their entirety.

TECHNICAL FIELD

The embodiments relate generally to machine learning models and vision-language models, and more specifically, to systems and methods for unified vision-language pre-training.

BACKGROUND

Vision-language models are configured to match an image with a proper caption. Vision-language pre-training (VLP) has been used to improve performance of downstream vision and language tasks by pretraining models on large-scale image-text pairs. Current VLP faces several limitations. For example, current methods struggle to perform text generation tasks (e.g., image captioning), while others have not been adopted for image-text retrieval tasks. Additionally, pre-training occurs on image-text pairs collected from the internet due to limited high-quality human-annotated training material. This web text is noisy and thus suboptimal for vision-language learning.

Therefore, there is a need for unified VLP incorporating both vision-language understanding and generation tasks.

BRIEF DESCRIPTION OF THE DRAWINGS

FIGS. 7-19 provide example data tables and examples illustrating example performance of data experiments of the proposed MED pretraining and dataset bootstrapping, according to embodiments described herein.

Figure 1:
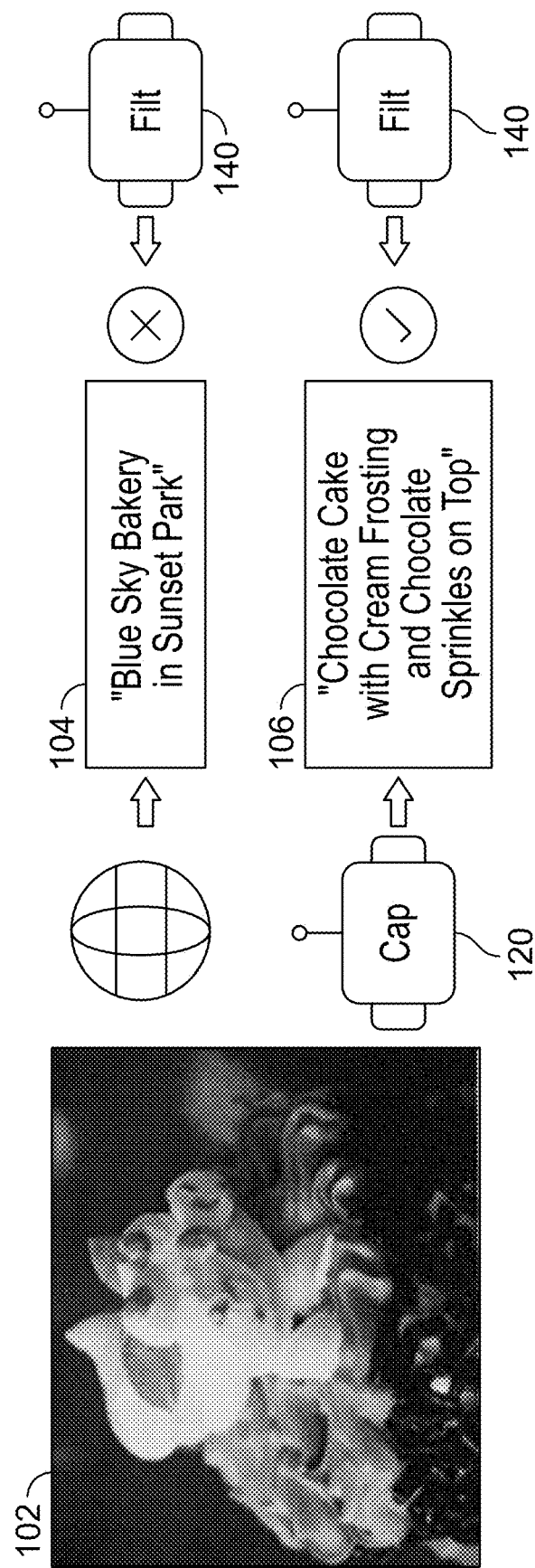
FIG. 1 is a simplified block diagram illustrating an aspect of generating enhanced captions for an image, according to embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Vision-language models are configured to match an image with a proper caption. These models are often pre-trained on large-scale image-text pairs. However, human annotated image-text training dataset is either limited in scale or can be costly. On the other hand, image-text training data obtained from other sources, such as web images and accompanying texts, are often noisy, e.g., image-text pairs collected from the internet such as web images and captions downloaded from the web. Alt-text collected from the internet is often inaccurate and noisy, and thus renders suboptimal performance for vision-language learning.

Additionally, existing vision-language models can be limited because most models either adopt an encoder-based model or an encoder-decoder based model. Encoder-decoder models have not been adopted for image-text retrieval tasks.

In view of the need for a unified VLP framework to learn from noisy image-text pairs, a multimodal mixture of encoder-decoder (MED) architecture is used for effective multi-task pre-training and flexible transfer learning. Specifically, the MED can operate either as a text-only encoder, or an image-grounded text encoder, or an image-grounded text decoder. Thus, the model is jointly pre-trained with three objectives: image-text contrastive learning, image-text matching, and language modeling using even very noisy image-text training data (e.g., from the web). In this way, the multiple training objectives help to enhance the model's ability to learn image-text matching.

In another embodiment, a two-model mechanism is provided to improve the quality of noisy image-text training data. A captioner (e.g., a pre-trained image-grounded text decoder) may be finetuned using a small set of human annotated image-text pairs based on language modeling loss. A filter (e.g., a pre-trained image-grounded text encoder) may be finetuned using the small set of human annotated image-text pairs based on image-text contrastive loss and image-text matching loss. Then the captioner is used to generate a caption for an image from the noisy training data, and the filter is used to filter original noisy captions and/or the generated captions from the noisy training data. The resulting filtered images and texts can then form a dataset for pre-training any new vision-language models. The captioner and the filter work together to achieve substantial performance improvement on various downstream tasks by bootstrapping the captions.

FIG. 1 is a simplified block diagram illustrating an aspect of generating enhanced captions for an image, according to embodiments described herein. For example, as shown in FIG. 1, for an image 102, a text description 104 may be downloaded from the web together with the image 102, which reads "blue sky bakery in sunset park." However, the captioner model 120 may generate a predicted text description 106, e.g., "chocolate cake with cream frosting and chocolate sprinkles on top." The filter model 140 may then generate a filtering decision indicating whether the downloaded text description 104 (no) or the generated description 106 (yes) matches with the image 102. In this way, the unmatching text description 104 may be removed to improve the image-text pair accuracy.

Figure 2:
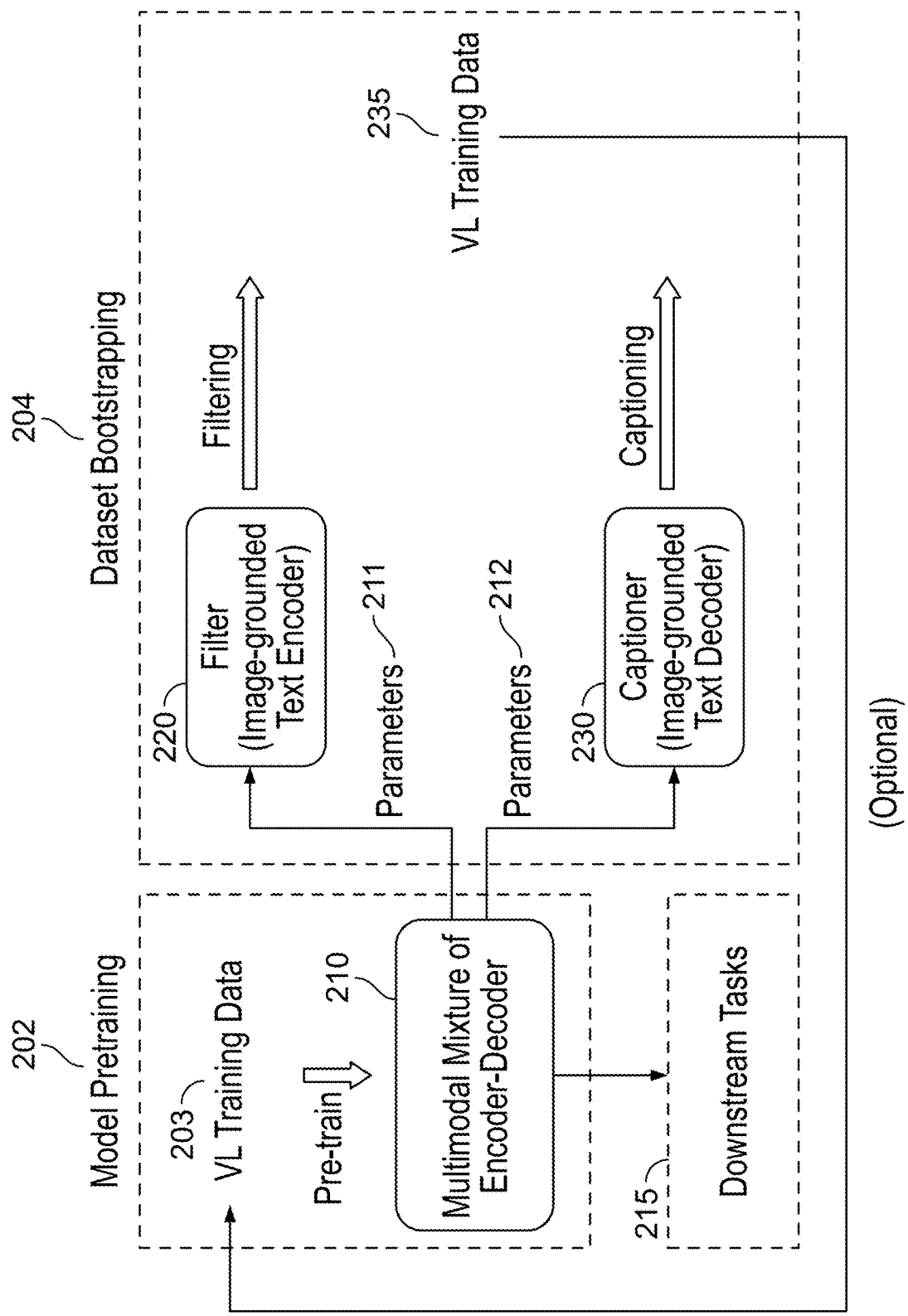
FIG. 2 is a simplified block diagram illustrating an example pre-training model framework for a multimodal vision-language model, according to some embodiments described herein.

FIG. 2 is a simplified block diagram illustrating an example pre-training model framework for a multimodal vision-language model, according to some embodiments described herein. The pre-training model framework comprises the model pretraining stage 202 and the dataset bootstrapping stage 204. Specifically, at the pre-training stage 202, a multimodal mixture of encoder-decoder (MED) 210 is pre-trained with vision-language training data 203. For example, as further discussed in relation to FIG. 3, the MED 210 may operate in one of three ways: 1) a text-only encoder that is trained with an image-text contrastive (ITC) loss to align the vision and language representations, 2) an image-grounded text encoder that uses additional cross-attention layers to model vision-language interactions and is trained with an image-text matching (ITM) loss to distinguish between positive and negative image-text pairs, and 3) an image-ground text decoder that replaces the bi-directional self-attention layers with a causal self-attention layers, shares the same cross-attention layers and feed forward networks as the encoder, and is trained with a language modeling (LM) loss to generate captions for images. The pre-trained MED model 210 can then be trained for a number of vision-language downstream tasks.

In one embodiment, at the dataset bootstrapping stage 204, a captioner 230 (an image-grounded text decoder) and a filter 220 (an image-grounded text encoder) may load pre-trained parameters 212, 211 from the pretrained MED 210, respectively. The captioner 230 is configured to produce synthetic captions for web images, and the filter 220 is configured to remove noisy image-text pairs from training data and the generated captions from the captioner 230. The captioner and filter are initialized from the same pre-trained model and finetuned individually on a small-scale human-annotated dataset. The bootstrapped dataset of vision-language training data 235 from the filtered results of the filter 220 may then be used to pre-train a new MED model.

Figure 3:
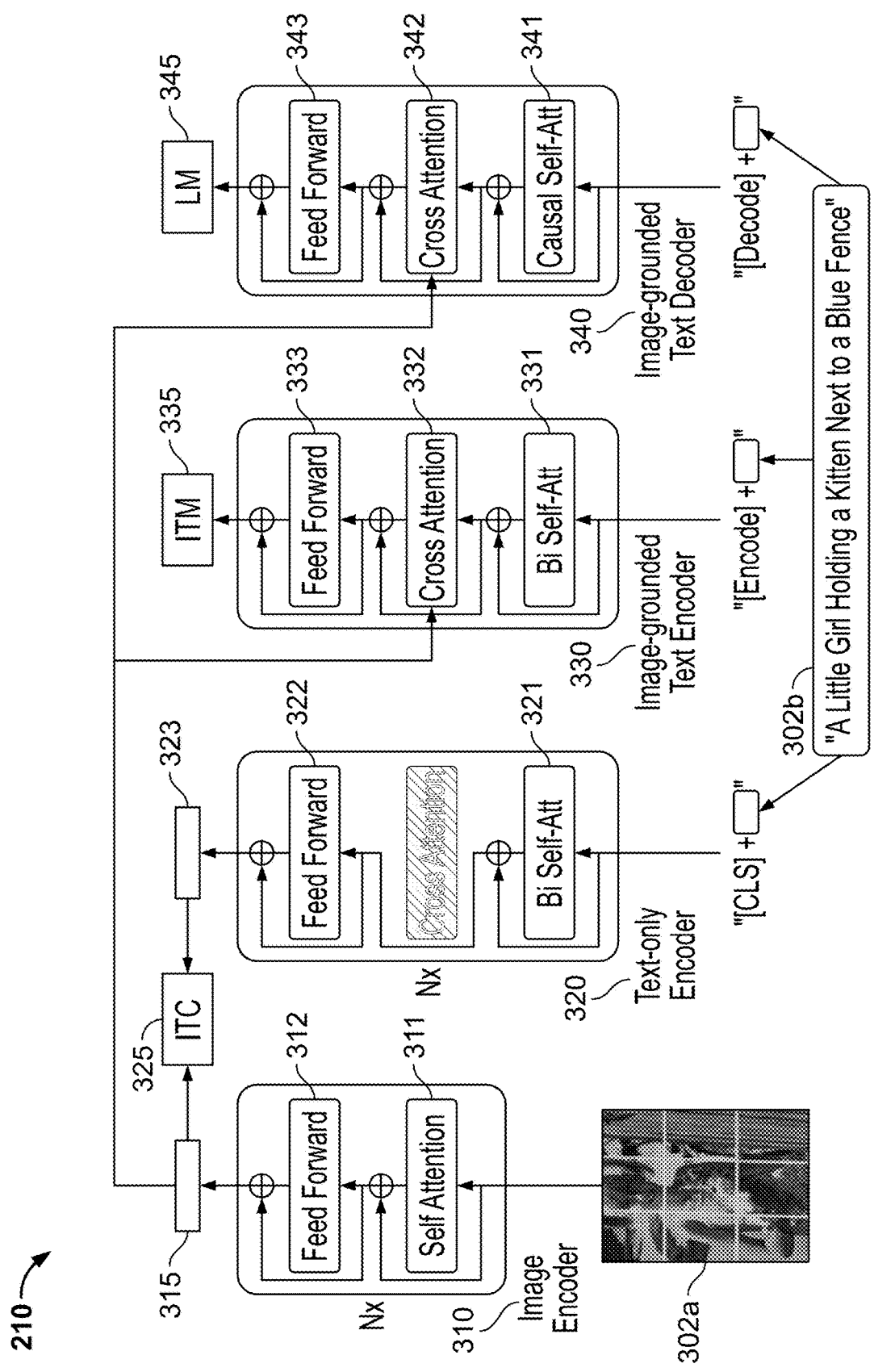
FIG. 3 is a simplified block diagram illustrating the pre-training model architecture and training objectives at the pretraining stage, according to embodiments described herein.

FIG. 3 is a simplified block diagram illustrating the pre-training model architecture and training objectives at the pretraining stage 202, according to embodiments described herein. The pre-training stage 202 my employ a visual transformer as an image encoder 310, which divides an input image 302a into patches and encodes them as a sequence of embeddings 315, with an additional [CLS] token to represent the global image feature. For example, the image encoder 310 may contains a plurality of self attention layers 311 followed by feed forward layers 312.

In one implementation, pre-trained object detectors may be used for visual feature extraction. Or a ViT that is more computation-friendly may be used for feature extraction.

In one embodiment, in order to pre-train a unified model with both understanding and generation capabilities, the MED 210 may be a multi-task transformer that may operate in one of the tree functionalities: a text-only encoder 320, an image-grounded text encoder 330 or an image-grounded text decoder 340.

The text-only encoder 320 may be a text transformer encoder (e.g., BERT) comprising a stack of bidirectional self-attention layers 321 followed by feed forward layers 322. A [CLS] token is appended to the beginning of the text input 302b to summarize the sentence, and input to the bidirectional self-attention layers 321.

The image-grounded text encoder 330 may comprise a stack of bidirectional self-attention layers 331 followed by cross-attention layers 332 and then followed by feed forward layers 333. The image-grounded text encoder 330 may inject visual information by inserting one additional cross-attention (CA) layer 332 between the self-attention (SA) layer 331 and the feed forward network (FFN) 333 for each transformer block. At input, a task-specific [Encode] token is appended to the text 302b, and the output embedding of [Encode] is used as the multimodal representation of the image-text pair.

The image-grounded text decoder 340 may comprise a stack of bidirectional causal-attention layers 341 followed by cross-attention layers 332 and then followed by feed forward layers 333. The image-grounded text decoder 340 replaces the bidirectional self-attention layers 321 in the text encoder 320 with causal self-attention layers 341. At input, a special [Decode] token is used to signal the beginning of a sequence, and an end-of-sequence token is used to signal its end.

In one embodiment, three objectives are jointly optimized during pre-training for the text encoder 320, the image-grounded text encoder 330 and the image-grounded text decoder 340 (and optionally the image encoder 310). Two understanding-based objectives such as image-text contrastive (ITC) loss and image-text matching (ITM) loss, and one generation based objective such as the language modeling (LM) loss are used. Each image-text pair only requires one forward pass through the computational-heavier visual transformer, and three forward passes through the text transformer, where different functionalities are activated to compute the three losses.

Specifically, the text-only encoder 320 is trained by the ITC loss 325, which aligns the feature space of the visual transformer (image encoder 310) and the text transformer 320 by encouraging positive image-text pairs to have similar representations in contrast to the negative pairs. For example, the ITC loss 325 may be computed using a momentum encoder to produce image features 315 and text features 323, and soft labels are created as training targets to account for the potential positives in the negative pairs.

In one embodiment, the image-grounded text encoder 340 is trained by the ITM loss 335, which aims to learn image-text multimodal representation that captures the fine-grained alignment between vision and language. The ITM loss is computed by a binary classification output, where the model uses an ITM head (a linear layer) to predict whether an image-text pair is positive (matched) or negative (unmatched) given their multimodal feature. In order to find more informative negatives, the hard negative mining strategy described in Li et al., Align before fuse: Vision and language representation learning with momentum distillation, in proceedings of NeurIPS, 2021, may be adopted, where negatives pairs with higher contrastive similarity in a batch are more likely to be selected to compute the loss.

The image-grounded text decoder 340 is trained by the LM loss 345, which generates textual descriptions given an image. At input, a task-specific token [Decode] is appended to the input text 302b, and cross-attention is applied to the input text and image representation 315. The LM loss 345 optimizes a cross entropy loss which trains the model 340 to maximize the likelihood of the text in an autoregressive manner. A label smoothing of 0.1 when computing the loss. In this way, LM enables the model with the generalization capability to convert visual information into coherent captions.

In order to perform efficient pre-training while leveraging multi-task learning, the text encoder 320 and text decoder 340 share all parameters except for the self-attention layers. For example, bidirectional layers 321, 331 share the same parameters; feed forward layers 322, 333 and 343 share the same parameters; and cross-attention layers 332 and 342 share the same parameters. The reason is that the differences between the encoding and decoding tasks are best captured by the self-attention layers 321 or 331. In particular, the encoders 320 and 330 employ bi-directional self-attention 321 and 331, respectively, to build representations for the current input tokens, while the decoder 340 employs causal self-attention 341 to predict next tokens. On the other hand, the embedding layers, cross-attention layers 332, 342 and feedforward layers 322, 333, 343 function similarly between encoding and decoding tasks, therefore sharing these layers improves training efficiency while benefiting from multi-task learning.

Figure 4:
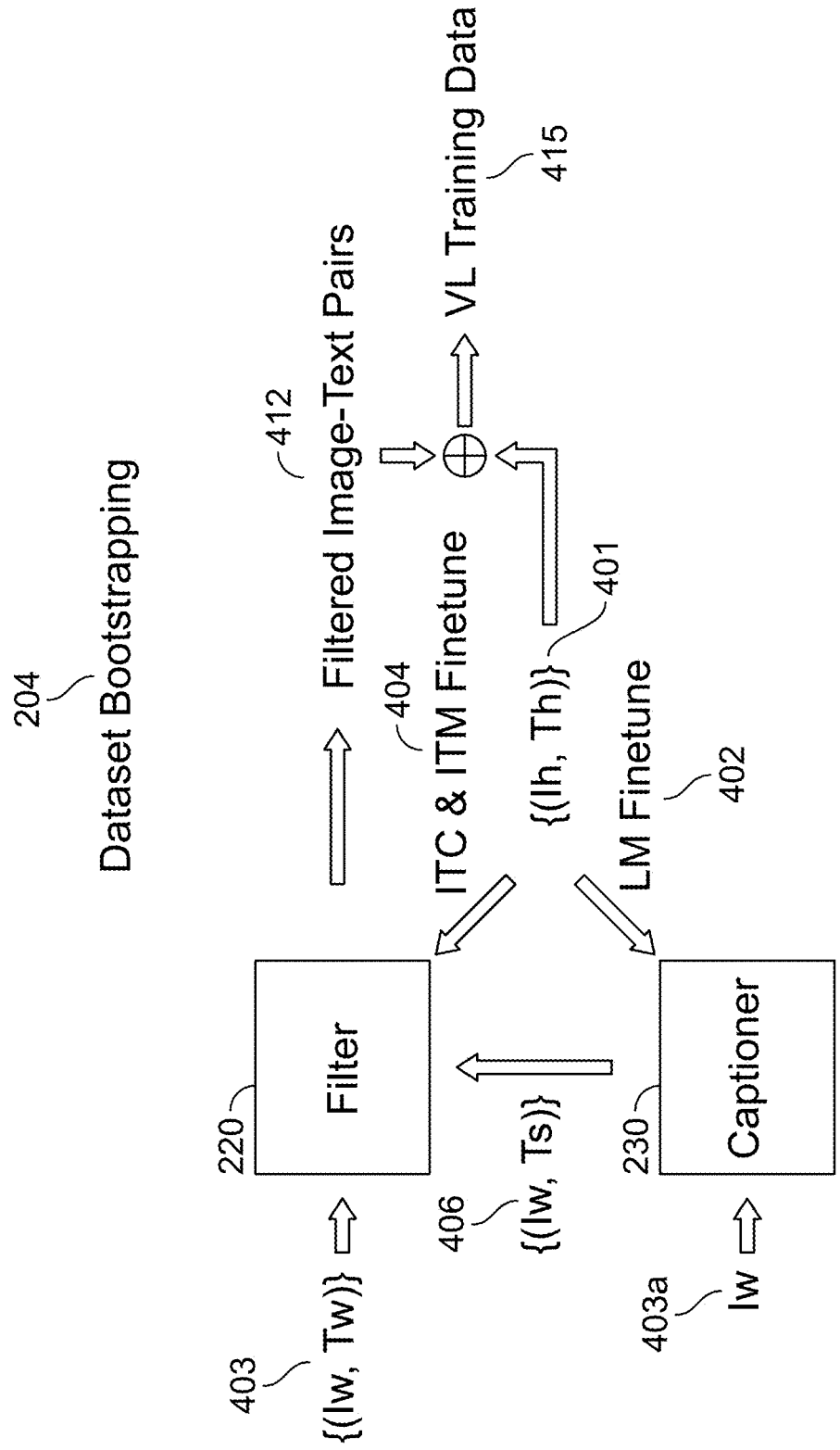
FIG. 4 is a simplified block diagram illustrating the dataset bootstrapping stage, according to embodiments described herein.

FIG. 4 is a simplified block diagram illustrating the dataset bootstrapping stage 204, according to embodiments described herein. The dataset bootstrapping stage 204 involves two modules: the captioner 230 to generate captions given web images, and the filter 220 to remove noisy image-text pairs. Both the captioner and the filter are initialized from the same pre-trained MED model 210, e.g., using parameters of the pre-trained image-grounded text decoder 340 and the image-grounded text encoder 330, respectively.

In one embodiment, due to the prohibitive annotation cost, there exist a limited number of high-quality human-annotated image-text pairs 401, $\{(I_h, T_h)\}$. In the meantime, a much larger number of image and alt-text pairs 403 $\{(I_w, T_w)\}$ that are automatically collected from the web may be available. However, the alt-texts often do not accurately describe the visual content of the images, making them a noisy signal that is suboptimal for learning vision-language alignment.

The high-quality human-annotated image-text pairs 401, $\{(I_h, T_h)\}$ may be used to finetune the captioner 230 and the filter 220. Specifically, the captioner 230 may be finetuned with the LM objective (at 402) to decode texts given images. For example, given an input image $I_h$, the captioner 230 generates a predicted text $T_h'$, which is compared with the paring text $T_{jh}$ to compute the LM loss. The finetuned captioner 230 may generate, given the web images 403$aI_w$, synthetic captions $T_s$ with one caption per image, e.g., $\{(I_w, T_s)\}$ 406.

The filter 220 is then finetuned with the ITC and ITM objectives (at 404) to learn whether a text matches an image. For example, given an input positive pair $\{(I_h, T_h)\}$, the filter 220 encodes the input positive pair, and also encodes negative pairs. A ITC loss is computed based on the encodings of the positive pair and encodings of the negative pairs. Or, the filter 220 may generate a binary classification indicating whether an input pair taken from the high-quality human-annotated image-text pairs 401 is a match or not, to compute an ITM loss.

The fine-tuned filter 220 may receive the synthetic caption pairs $\{(I_w, T_s)\}$ 406 from the captioner 230, and/or the original web image-text pairs 403 $\{(I_w, T_w)\}$ to determine whether these image-text pairs are matches in order to remove noisy texts in both the original web texts $T_w$ and the synthetic texts $T_s$. For example, a text is considered to be noisy if the ITM head predicts it as unmatched to the image. Finally, the filtered image-text pairs 412 are combined with the human-annotated pairs 401 to form a new dataset of vision-language training data 415, which can in turn be used to pre-train a new MED model or any other vision-language model.

Figure 5:
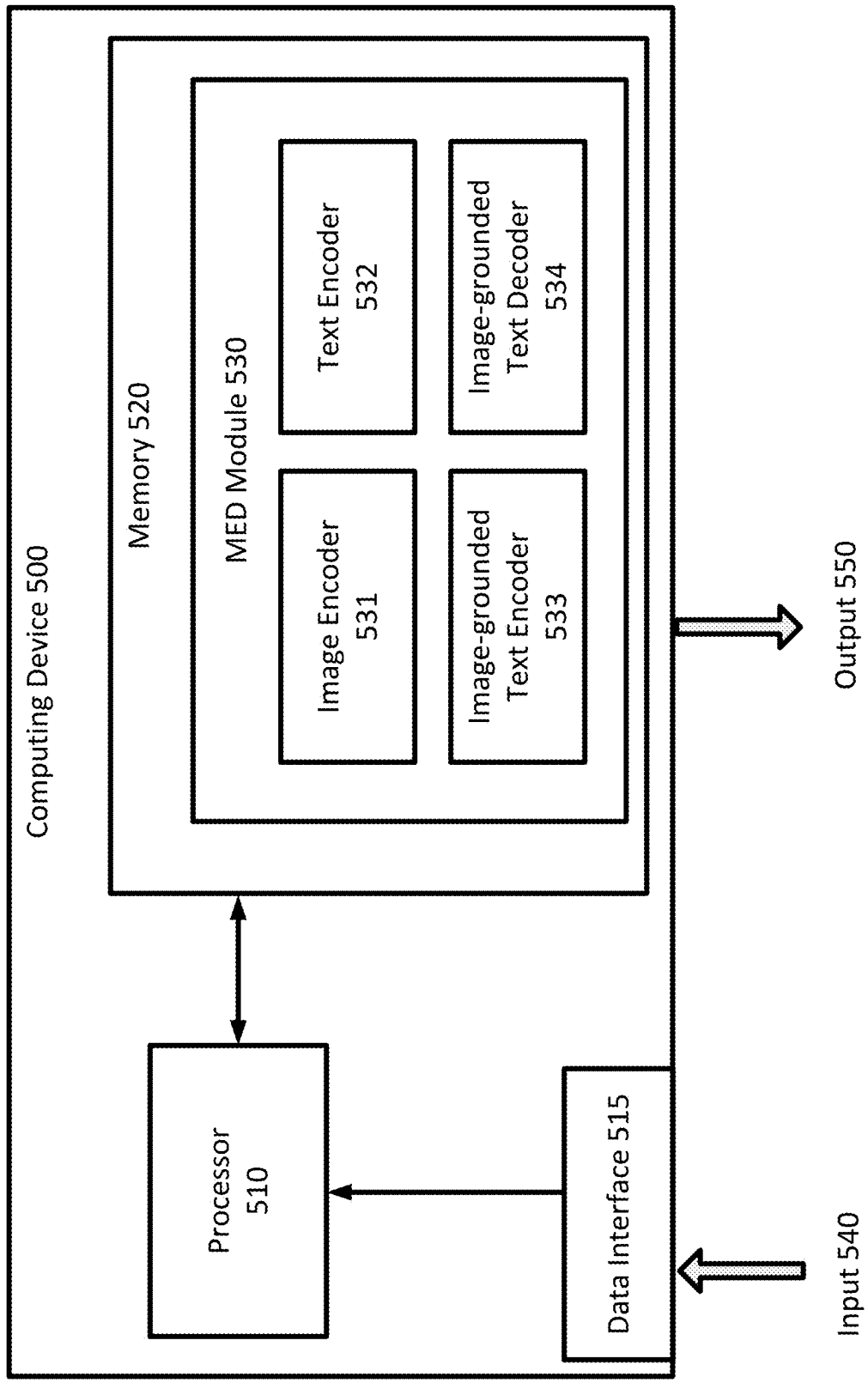
FIG. 5 is a simplified diagram of a computing device 500 for implementing the multimodal encoder-decoder (MED) model pre-training and dataset bootstrapping framework, according to some embodiments.

FIG. 5 is a simplified diagram of a computing device 500 for implementing the MED model pre-training and dataset bootstrapping framework, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for MED module 530 that may be used to implement and/or emulate the systems and models, and/or to implement any of the methods described further herein. A trained MED module 530 may receive input 540 such as an image input, a text input, or image-text pairs via the data interface 515 and generate an output 550 which may be a vision-language task output. The data interface 515 may comprise a communication interface, or a user interface.

In some embodiments, the MED module 530 includes an image encoder 531 (e.g., similar to 310 in FIG. 3), a text encoder 532 (e.g., similar to 320 in FIG. 3), an image-grounded text encoder 533 (e.g., 330 in FIG. 3) and an image-grounded text decoder 534 (e.g., 340 in FIG. 3).

In one embodiment, the MED module 530 and its sub-modules 531-534 may be implemented by hardware, software and/or a combination thereof.

Some examples of computing devices, such as computing device 500 may include non-transitory, tangible, machine readable media that include executable code that when run by one or more processors (e.g., processor 510) may cause the one or more processors to perform the processes of method. Some common forms of machine readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6A:
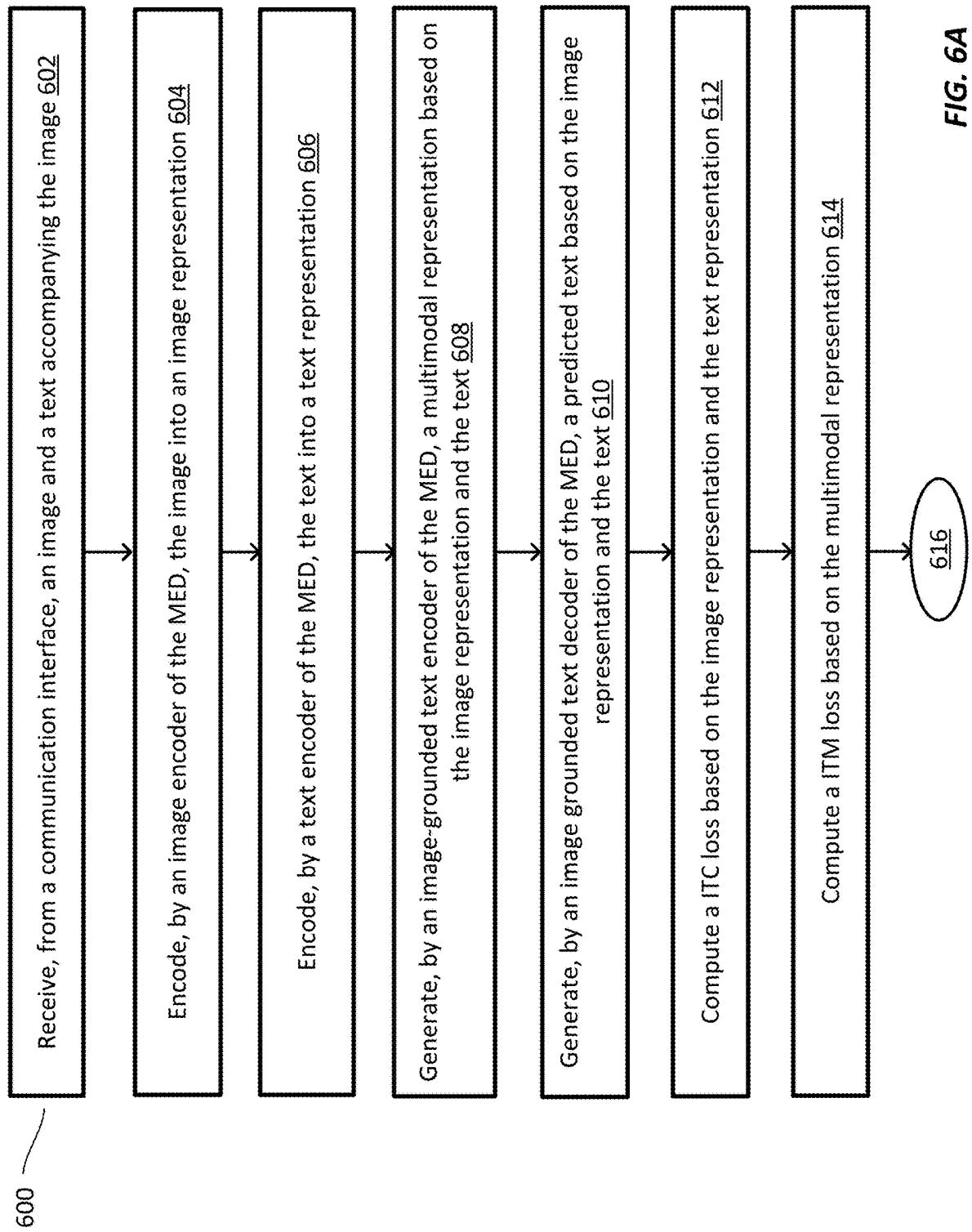
FIGS. 6A-6C provide a simplified logic flow diagram illustrating a method of pre-training a MED model for downstream tasks and dataset bootstrapping, according to some embodiments described herein.
Figure 6B:
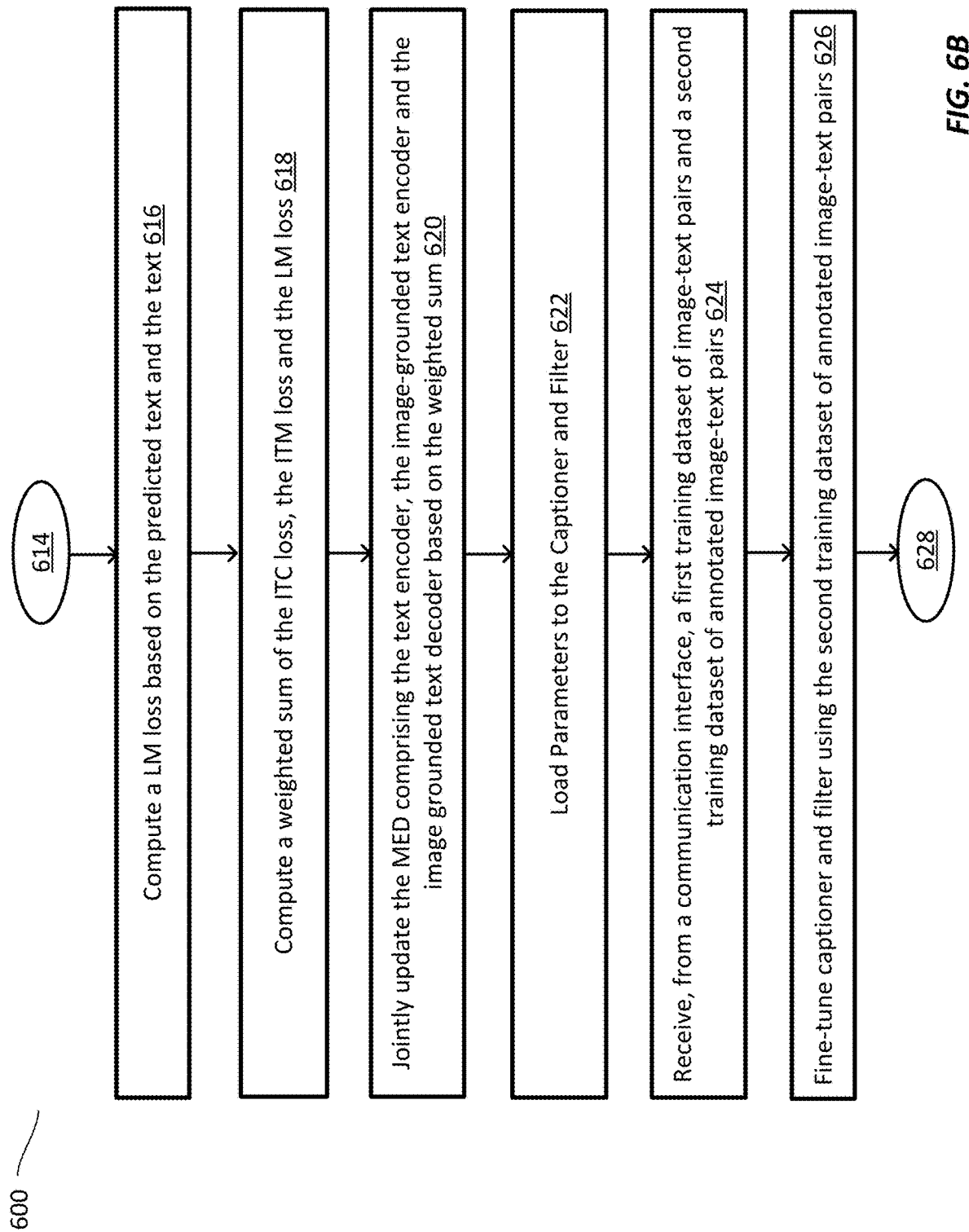
Figure 6C:
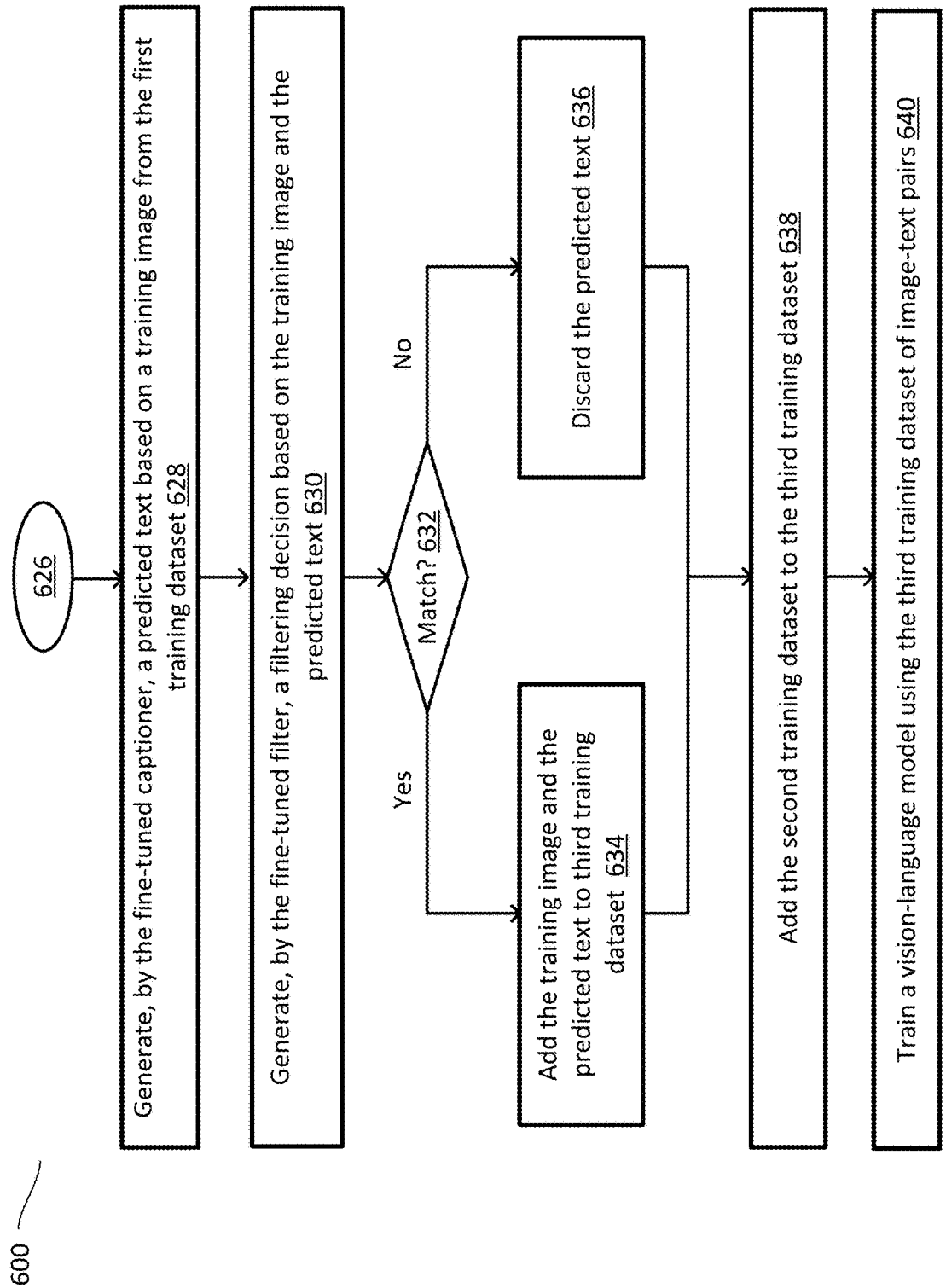

FIGS. 6A-6C provide a simplified logic flow diagram illustrating a method of pre-training a MED model for downstream tasks and dataset bootstrapping, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the MED module 530 (FIG. 5) to perform query-focused summarization.

At step 602, an image (e.g., 302*a* in FIG. 3) and a text (e.g., 303*b* in FIG. 3) accompanying the image are received, from a communication interface (e.g., 515 in FIG. 5). For example, the image and the text are received at an MED (e.g., 210 in FIG. 2) that operates as the image encoder, the text encoder, the image-grounded text encoder or the image grounded text decoder independently.

At step 604, an image encoder (e.g., 310 in FIG. 3) of the MED may encode the image into an image representation (e.g., 315 in FIG. 3). For example, the image encoder applies self-attention to the image, and then applies a feedforward layer to a self-attention output.

At step 606, a text encoder (e.g., 320 in FIG. 3) of the MED may encode the text into a text representation (e.g., 323 in FIG. 3). For example, the text encoder applies bidirectional self-attention to the text appended with a start token.

At step 608, an image-grounded text encoder (e.g., 330 in FIG. 3) of the MED may generate a multimodal representation based on the image representation and the text. For example, the image-grounded text encoder may apply bidirectional self-attention to the text appended with an encoding indicator, and apply cross-attention to a bidirectional self-attention output and the image representation.

At step 610, an image grounded text decoder (e.g., 340 in FIG. 3) of the MED may generate a predicted text based on the image representation and the text. For example, the image-grounded text decoder may apply causal self-attention to the text appended with a decoding indicator, and apply cross-attention to a causal self-attention output and the image representation.

At step 612, an ITC loss is computed based on the image representation and the text representation. For example, the ITC loss is computed from a positive pair of the image representation and the text representation, and a plurality of negative pairs of the image representation and negative text representations generated from texts that do not match with the image. The ITC loss may be used to update the image encoder and the text encoder.

At step 614, an ITM loss is computed based on the multimodal representation.

For example, an image-text matching (ITM) head may generate a binary classification indicating whether the image and the text are a match based on the multimodal representation, and the ITM loss is computed based on the binary classification. The image-grounded text encoder may be updated based on the ITM loss.

At step 616, a LM loss is computed based on the predicted text and the text. For example, the LM loss may be computed as a cross-entropy between the predicted text and the text, and wherein the third loss is used to update the image-grounded text decoder.

At step 618, a weight sum of the ITC loss, the ITM loss and the LM loss may be computed.

At step 620, the MED comprising the text encoder, the image-grounded text encoder and the image grounded-text decoder may be jointly updated based on the weighted sum of losses.

At step 622, parameters of the pre-trained MED may be loaded to the captioner (e.g., 230 in FIG. 4) and the filter (e.g., 220 in FIG. 4).

At step 624, a first training dataset of image-text pairs and a second training dataset of annotated image-text pairs may be received, via the communication interface (e.g., 515 in FIG. 5). For example, the first training dataset may be a large scale image-text dataset containing web images and alt-texts that may or may not be an accurate description of the images. The second training dataset may be a small scale human annotated image-text dataset.

At step 626, the captioner (e.g., image-grounded text decoder) and the filter (e.g., image-grounded text encoder) may be finetuned using the second training dataset of annotated image-text pairs. For example, the captioner (image-grounded text decoder) is finetuned by generating a predicted text in response to an image in the second training dataset, and computing a language modeling loss comparing the predicted text with an annotated text paired with the image.

The image-grounded text encoder is finetuned by generating a text encoding of a text from the second training dataset, generating an image encoding of an image pairing the text from the second training dataset, and computing an image-text contrastive loss based on a positive pair of the text encoding and the image encoding, and negative pairs of the image encoding paired with other text encodings. Or the image-grounded text encoder may be finetuned by generating a binary classification indicating whether a text and an image from the second training dataset are a match, and computing an image-text matching loss comparing the binary classification and a ground truth.

At step 628, the fine-tuned image-grounded text decoder may generate a predicted text based on a training image from the first training dataset.

At step 630, the fine-tuned image-grounded text encoder may generate a filtering decision based on the training image and the predicted text. For example, the filter decision is generated by generating a binary classification indicating whether an input image and an input text matches.

At step 632, when the filtering decision indicates a match between the image and the text, the training image and the predicted text are added as a pair to form a third training dataset of image-text pairs at step 634. Otherwise, method 600 proceeds from decision 632 to step 636, where the predicted text is discarded when the filtering decision indicates the predicted text does not pair with the image.

At step 638, the second training dataset is added to the third training dataset.

At step 640, a new vision-language model may be trained using the third training dataset of image-text pairs. For example, the new vision-language model may include any combination of an image encoder, a text encoder, an image-grounded text encoder or an image grounded text decoder.

FIGS. 7-19 provide example data tables and examples illustrating example performance of data experiments of the proposed MED pretraining 202 and dataset bootstrapping 204, according to embodiments described herein. The MED model may be implemented in PyTorch and pre-trained on two 16-GPU nodes. The image transformer is initialized from ViT pre-trained on ImageNet and the text transformer is initialized from BERTbase. Two variants of ViTs: ViT-B/16 and ViT-L/16 are studies. Unless otherwise specified, all results reported as "bootstrapping language-images pre-training (BLIP)" uses ViT-B. The model is pre-trained for 20 epochs using a batch size of 2880 (ViTB)/2400 (ViT-L). AdamW optimizer is used with a weight decay of 0.05. The learning rate is warmed-up to 3e-4 (ViT-B)/2e-4 (ViT-L) and decayed linearly with a rate of 0.85. Random image crops of resolution 224×224 during pre-training are used, and the image resolution is increased to 384×384 during finetuning.

The same pre-training dataset as described in Li et al. 2021 with 14M images in total, including two human-annotated datasets (COCO (Lin et al., COCO: common objects in context, in proceedings of ECCV, volume 8693, pp. 740-755, 2014) and Visual Genome), and three web datasets (Conceptual Captions, Conceptual 12M (Changpinyo et al., Conceptual 12M: Pushing web-scale image-text pre-training to recognize long-tail visual concepts, in proceedings of CVPR, 2021), SBU captions (Ordonez et al., Im2text: Describing images using 1 million captioned photographs, in proceedings of NIPS, pp. 1143-1151, 2011). An additional web dataset, LAION (Schuhmann et al., LAION-400m: Open dataset of clipfiltered 400 million image-text pairs, arXiv preprint, arXiv: 2111.02114, 2021) is experimented with, which contains 115M images with more noisy texts.

In FIG. 7, models pre-trained on different datasets to demonstrate the efficacy of the captioner and filter (denoted as "CapFilt") on downstream tasks, including image-text retrieval and image captioning with finetuned and zero-shot settings. When only the captioner or the filter is applied to the dataset with 14M images, performance improvement can be observed. When applied together, their effects compliment each other, leading to substantial improvements compared to using the original noisy web texts. CapFilt can further boost performance with a larger dataset and a larger vision backbone, which verifies its scalability in both the data size and the model size. Furthermore, by using a large captioner and filter with ViT-L, performance of the base model can also be improved.

FIG. 8 shows some example captions and their corresponding images, which qualitatively demonstrate the effect of the captioner to generate new textual descriptions, and the filter to remove noisy texts from both the original web captions and the synthetic captions.

In CapFilt, nucleus sampling (Holtzman et al., The curious case of neural text degeneration, in proceedings of ICLR, 2020) may be employed to generate synthetic captions. Nucleus sampling is a stochastic decoding method, where each token is sampled from a set of tokens whose cumulative probability mass exceeds a threshold p (p=0.9 in the experiments). FIG. 9 compares it with beam search, a deterministic decoding method which aims to generate captions with the highest probability. Nucleus sampling leads to evidently better performance, despite being more noisy as suggested by a higher noise ratio from the filter. It may be hypothesized that the reason is that nucleus sampling generates more diverse and surprising captions, which contain more new information that the model could benefit from. On the other hand, beam search tends to generate safe captions that are common in the dataset, hence offering less extra knowledge.

During pre-training, the text encoder and decoder share all parameters except for the self-attention layers. In FIG. 10, models pre-trained with different parameter sharing strategies are evaluated, where pre-training is performed on the 14M images with web texts. As the result shows, sharing all layers except for SA leads to better performance compared to not sharing, while also reducing the model size thus improving training efficiency. If the SA layers are shared, the model's performance would degrade due to the conflict between the encoding task and the decoding task.

During CapFilt, the captioner and the filter are end-to-end finetuned individually on COCO. FIG. 11 studies the effect if the captioner and filter share parameters in the same way as pre-training. The performance on the downstream tasks decreases, which we mainly attribute to confirmation bias. Due to parameter sharing, noisy captions produced by the captioner are less likely to be filtered out by the filter, as indicated by the lower noise ratio (8% compared to 25%).

FIGS. 12-14 compare BLIP to existing VLP methods on a wide range of vision-language downstream tasks. For example, BLIP is evaluated for both image-to-text retrieval (TR) and text-to-image retrieval (IR) on COCO and Flickr30K (Plummer et al., Flickr30k entities: Collecting region-to-phrase correspondences for richer image-to-sentence models, in proceedings of ICCV, pp. 2641-2649, 2015) datasets. The pre-trained model is finetuned using ITC and ITM losses. To enable faster inference speed, k candidates are first selected based on the image-text feature similarity, and then re-rank the selected candidates based on their pairwise ITM scores, e.g., k=256 for COCO and k=128 for Flickr30K.

Baseline model for comparison include: UNITER (Chen et al., UNITER: universal image-text representation learning, in proceedings of ECCV, volume 12375, pp. 104-120, 2020), VILLA (Gan et al., Large-scale adversarial training for vision-and-language representation learning. In Larochelle, in proceedings of NeurIPS, 2020), OSCAR (Li et al., Oscar: Object-semantics aligned pre-training for vision-language tasks, in proceedings of ECCV, pp. 121-137, 2020), UNIMO (Li et al., UNIMO: towards unified-modal understanding and generation via cross-modal contrastive learning, in proceedings of ACL, pp. 2592-2607, 2021), ALIGN (Jia et al., Scaling up visual and vision-language representation learning with noisy text supervision, arXiv preprint arXiv: 2102.05918, 2021), ALBEF (Li et al., Align before fuse: Vision and language representation learning with momentum distillation, in proceedings of NeurIPS, 2021), Enc-Dec (Changpinyo et al., Conceptual 12M: Pushing web-scale image-text pre-training to recognize long-tail visual concepts, in proceedings of CVPR, 2021), VinVL (Zhang et al., Vinvl: Making visual representations matter in vision-language models, arXiv preprint, arXiv: 2101.00529, 2021), LEMON (Hu et al., Scaling up vision-language pre-training for image captioning, 2021), and SimVLM (Wang et al., SimVLM: Simple visual language model pretraining with weak supervision, arXiv preprint arXiv: 2108.10904, 2021).

As shown in FIG. 12, BLIP achieves substantial performance improvement compared with existing methods. Using the same 14M pre-training images, BLIP outperforms ALBEF by +2.7% in average recall@1 on COCO. In zero-shot retrieval by directly transferring the model trained on COCO to Flickr30K, the result is shown in FIG. 13, where BLIP also outperforms existing methods by a largemargin.

In another embodiment, for the image captioning task, two datasets for image captioning are used: NoCaps (Agrawal et al., NoCaps: novel object captioning at scale, in proceedings of ICCV, pp. 8947-8956, 2019) and COCO, both evaluated using the model finetuned on COCO with the LM loss. A prompt "a picture of" is added at the beginning of each caption, which leads to slightly better results. As shown in FIG. 14, BLIP with 14M pretraining images substantially outperforms methods using a similar amount of pre-training data. BLIP with 129M images achieves competitive performance as LEMON with 200M images. Note that LEMON requires a computational heavy pre-trained object detector and higher resolution (800×1333) input images, leading to substantially slower inference time than the detector-free BLIP which uses lower resolution (384× 384) input images.

Figure 15A:
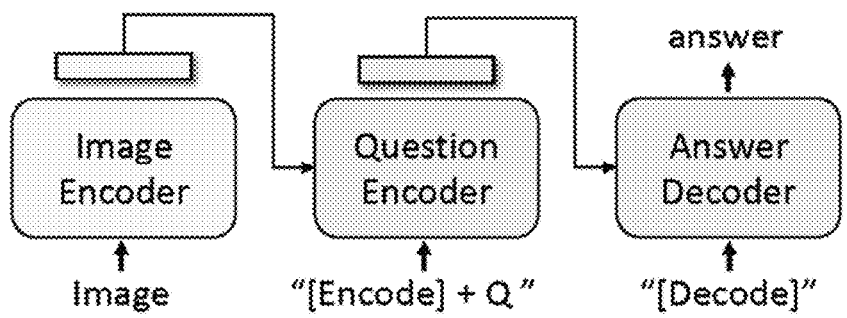

In one embodiment, the task of visual question answering (VQA) requires the model to predict an answer given an image and a question. Instead of formulating VQA as a multi-answer classification task, it is formulated as an answer generation task, which enables open-ended VQA. As shown in FIG. 15A, during finetuning, the pre-trained model is re-arranged, where an image-question is first encoded into multimodal embeddings and then given to an answer decoder. The VQA model is finetuned with the LM loss using ground-truth answers as targets.

The results are shown in FIG. 16, using 14M images, BLIP outperforms ALBEF by +1.64%. Using 129M images, BLIP achieves better performance than SimVLM which uses 13× more pre-training data and a larger vision backbone with an additional convolution stage.

In one embodiment, the natural language visual reasoning (NLVR) task asks the model to predict whether a sentence describes a pair of images. In order to enable reasoning over two images, we make a simple modification to the pre-trained model which leads to a more computational efficient architecture than previous approaches.

Figure 15B:
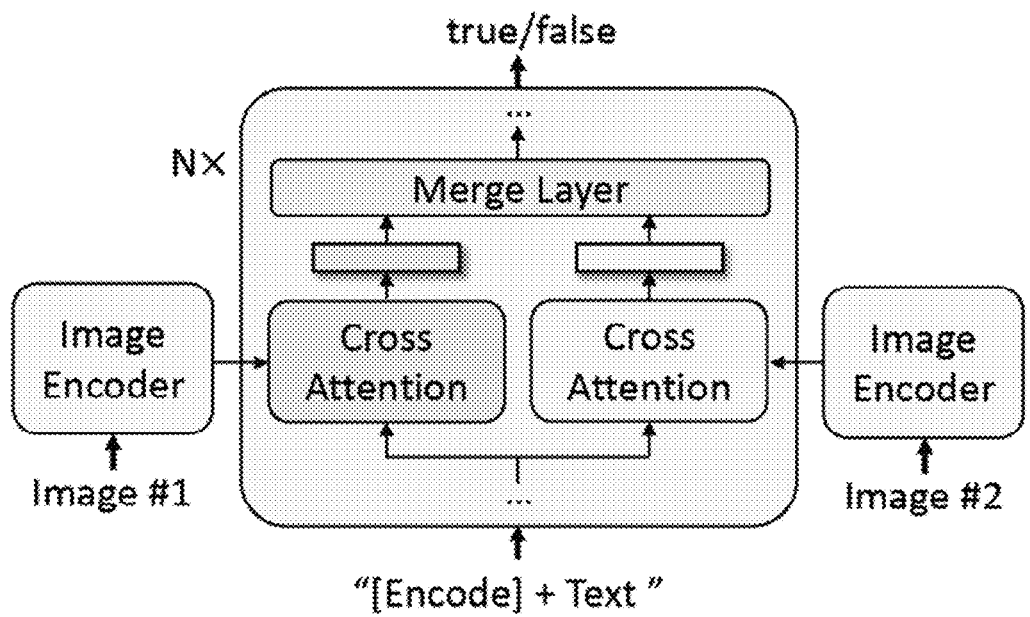

As shown in FIG. 15B, for each transformer block in the image-grounded text encoder, there exist two cross-attention layers to process the two input images, and their outputs are merged and fed to the FFN. The two CA layers are intialized from the same pre-trained weights. The merge layer performs simple average pooling in the first 6 layers of the encoder, and performs concatenation followed by a linear projection in layer 6-12. An multi-layer perceptron (MLP) classifier is applied on the output embedding of the [Encode] token. As shown in FIG. 16, BLIP outperforms all existing methods except for ALBEF which performs an extra step of customized pre-training. Interestingly, performance on NLVR does not benefit much from additional web images, possibly due to the domain gap between web data and downstream data.

In one embodiment, the visual dialog task extends VQA in a natural conversational setting, where the model needs to predict an answer not only based on the image-question pair, but also considering the dialog history and the image's caption. The discriminative setting where the model ranks a pool of answer candidates are used.

Figure 15C:
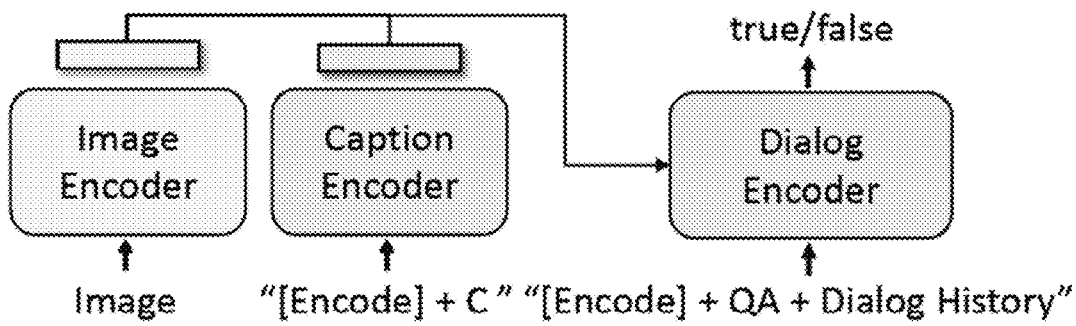

As shown in FIG. 15, image and caption embeddings are concatenated, and pass them to the dialog encoder through cross-attention. The dialog encoder is trained with the ITM loss to discriminate whether the answer is true or false for a question, given the entire dialog history and the image-caption embeddings. As shown in FIG. 17, BLIP achieves the best performance on VisDial v1.0 validation set.

In one embodiment, image-language model has strong generalization ability to video-language tasks. FIGS. 18-19 shows performance of zero-shot transfer to text-to-video retrieval and video question answering, where the models are trained on COCO-retrieval and VQA, respectively. Baseline models for comparison include ActBERT (Zhu et al., ActBERT: Learning global-local videotext representations, in proceedings of CVPR, pp. 8746-8755, 2020), SupportSet (Patrick et al., Support-set bottlenecks for video-text representation learning, in proceedings of ICLR, 2021), MIL-NCE (Miech et al., End-to-end learning of visual representations from uncurated instructional videos, in proceedings of CVPR, pp. 9879-9889, 2020), VideoCLIP (Xu et al., Videoclip: Contrastive pre-training for zero-shot videotext understanding, in proceedings of EMNLP, pp. 6787-6800, 2021), FIT (Bain et al., Frozen in time: A joint video and image encoder for end-to-end retrieval, in proceedings of ICCV, 2021), ClipBERT (Lei et al., Less is more: Clipbert for video-and-language learning via sparse sampling, in proceedings of CVPR, pp. 7331-7341, 2021), VQA-T (Yang et al., Generative data augmentation for commonsense reasoning, EMNLP Findings, pp. 1008-1025, 2020), HME (Fan et al., Heterogeneous memory enhanced multimodal attention model for video question answering, in proceedings of CVPR, pp. 1999-2007, 2019), and HCRN (Le et al., Hierarchical conditional relation networks for video question answering, in proceedings of CVPR, pp. 9972-9981, 2020).

To process video input, n frames are uniquely sampled per video (n=8 for retrieval and n=16 for QA), and concatenate the frame features into a single sequence. Note that this simple approach ignores all temporal information. Despite the domain difference and lack of temporal modeling, the models achieve state-of-the-art performance on both video-language tasks. For text-to-video retrieval, zero-shot BLIP even outperforms models finetuned on the target video dataset by +12.4% in recall@1.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of generating enhanced vison-language training data, the method comprising:
   receiving, from a communication interface, a first training dataset of image-text pairs and a second training dataset of annotated image-text pairs;
   fine-tuning an image-grounded text decoder and an image-grounded text encoder using the second training dataset of annotated image-text pairs;
   generating, by the fine-tuned image-grounded text decoder, a predicted text based on a training image from the first training dataset;
   generating, by the fine-tuned image-grounded text encoder, a filtering decision based on the training image and the predicted text;
   adding the training image and the predicted text to form a third training dataset of image-text pairs depending on the filter decision; and
   training a vision-language model using the third training dataset of image-text pairs.

2. The method of claim 1, wherein the image-grounded text decoder is finetuned by:
   generating a predicted text in response to an image in the second training dataset; and
   computing a language modeling loss comparing the predicted text with an annotated text paired with the image.

3. The method of claim 1, wherein the image-grounded text encoder is finetuned by:
   generating a text encoding of a text from the second training dataset;
   generating an image encoding of an image pairing the text from the second training dataset; and
   computing an image-text contrastive loss based on a positive pair of the text encoding and the image encoding, and negative pairs of the image encoding paired with other text encodings.

4. The method of claim 1, wherein the image-grounded text encoder is finetuned by:
   generating a binary classification indicating whether a text and an image from the second training dataset are a match; and
   computing an image-text matching loss comparing the binary classification and a ground truth.

5. The method of claim 1, wherein the filter decision is generated by generating a binary classification indicating whether an input image and an input text matches.

6. The method of claim 5, wherein the third training dataset is formed by adding the input image and the input text as a training pair when the binary classification indicates the input image and the input text match.

7. The method of claim 1, further comprising:
   adding the second training dataset to the third training dataset.

8. The method of claim 1, wherein the vision-language model includes any combination of an image encoder, a text encoder, an image-grounded text encoder or an image grounded text decoder.

9. The method of claim 1, wherein the image-grounded text decoder and the image-grounded text encoder at least partially share parameters.

10. A system of generating enhanced vison-language training data, the system comprising:
    a communication interface that receives a first training dataset of image-text pairs and a second training dataset of annotated image-text pairs;
    a memory storing a plurality of processor-executable instructions; and
    a processor executing the plurality of processor-executable instructions to perform operations comprising:
      fine-tuning an image-grounded text decoder and an image-grounded text encoder using the second training dataset of annotated image-text pairs;
      generating, by the fine-tuned image-grounded text decoder, a predicted text based on a training image from the first training dataset;
      generating, by the fine-tuned image-grounded text encoder, a filtering decision based on the training image and the predicted text;
      adding the training image and the predicted text to form a third training dataset of image-text pairs depending on the filter decision; and
      training a vision-language model using the third training dataset of image-text pairs.

11. The system of claim 10, wherein the image-grounded text decoder is finetuned by:
    generating a predicted text in response to an image in the second training dataset; and
    computing a language modeling loss comparing the predicted text with an annotated text paired with the image.

12. The system of claim 10, wherein the image-grounded text encoder is finetuned by:
    generating a text encoding of a text from the second training dataset;
    generating an image encoding of an image pairing the text from the second training dataset; and
    computing an image-text contrastive loss based on a positive pair of the text encoding and the image encoding, and negative pairs of the image encoding paired with other text encodings.

13. The system of claim 10, wherein the image-grounded text encoder is finetuned by:
    generating a binary classification indicating whether a text and an image from the second training dataset are a match; and
    computing an image-text matching loss comparing the binary classification and a ground truth.

14. The system of claim 10, wherein the filter decision is generated by generating a binary classification indicating whether an input image and an input text matches.

15. The system of claim 14, wherein the third training dataset is formed by adding the input image and the input text as a training pair when the binary classification indicates the input image and the input text match.

16. The system of claim 10, wherein the operations further comprise:
    adding the second training dataset to the third training dataset.

17. The system of claim 10, wherein the vision-language model includes any combination of an image encoder, a text encoder, an image-grounded text encoder or an image grounded text decoder.

18. A non-transitory processor-readable storage medium storing a plurality of processor-executable instructions for generating enhanced vison-language training data, the instructions being executed by a processor to perform operations comprising:

receiving, from a communication interface, a first training dataset of image-text pairs and a second training dataset of annotated image-text pairs;

fine-tuning an image-grounded text decoder and an image-grounded text encoder using the second training dataset of annotated image-text pairs;

generating, by the fine-tuned image-grounded text decoder, a predicted text based on a training image from the first training dataset;

generating, by the fine-tuned image-grounded text encoder, a filtering decision based on the training image and the predicted text;

adding the training image and the predicted text to form a third training dataset of image-text pairs depending on the filter decision; and training a vision-language model using the third training dataset of image-text pairs.

19. The non-transitory processor-readable storage medium of claim 18, wherein the image-grounded text encoder is finetuned by:

generating a binary classification indicating whether a text and an image from the second training dataset are a match; and computing an image-text matching loss comparing the binary classification and a ground truth.

20. The non-transitory processor-readable storage medium of claim 18, wherein the vision-language model includes any combination of an image encoder, a text encoder, an image-grounded text encoder or an image grounded text decoder.

* * * * *